(12) United States Patent
Porte et al.

(10) Patent No.: US 11,661,173 B2
(45) Date of Patent: May 30, 2023

(54) AIR INTAKE, NACELLE AND PROPULSION UNIT FOR MONOBLOC SECTOR AIRCRAFT

(71) Applicant: Airbus Operations S.A.S., Toulouse (FR)

(72) Inventors: Alain Porte, Colomiers (FR); Francois Pons, Daux (FR); Arnaud Bourhis, Plaisance du Touch (FR); Julien Sentier, Colomiers (FR)

(73) Assignee: Airbus Operations S.A.S.

( * ) Notice: Subject to any disclaimer, the term of this patent is extended or adjusted under 35 U.S.C. 154(b) by 875 days.

(21) Appl. No.: 16/507,470

(22) Filed: Jul. 10, 2019

(65) Prior Publication Data

US 2020/0017191 A1 Jan. 16, 2020

(30) Foreign Application Priority Data

Jul. 10, 2018 (FR) ..................................... 18 56337

(51) Int. Cl.
*B64C 7/02* (2006.01)
*B64D 29/06* (2006.01)
*F01D 25/24* (2006.01)

(52) U.S. Cl.
CPC ................ *B64C 7/02* (2013.01); *B64D 29/06* (2013.01); *F01D 25/24* (2013.01)

(58) Field of Classification Search
CPC ........... B64C 7/02; B64C 33/02; B64D 29/06; B64D 29/08
See application file for complete search history.

(56) References Cited

U.S. PATENT DOCUMENTS

| 3,541,794 A * | 11/1970 | Bollenbacher ............ F02K 3/06 239/265.29 |
| 6,725,542 B1 | 4/2004 | Maguire |
| 8,197,191 B2 | 6/2012 | Binks et al. |
| 2008/0179448 A1 | 7/2008 | Layland et al. |
| 2014/0023492 A1 | 1/2014 | Lucas |
| 2016/0039528 A1 | 2/2016 | Caruel |
| 2016/0313286 A1* | 10/2016 | Chiou .................. G01N 29/043 |

FOREIGN PATENT DOCUMENTS

FR 3004700 A1 10/2014

OTHER PUBLICATIONS https://www.cnn.com/2016/03/12/world/iron-maiden-plane-damaged-irpt/index.html.*
https://ultimateclassicrock.com/iron-maiden-plane-ed-force-one/.*

* cited by examiner

*Primary Examiner* — Timothy D Collins
*Assistant Examiner* — Eric Acosta
(74) *Attorney, Agent, or Firm* — Lerner David LLP

(57) ABSTRACT

An aircraft nacelle air intake includes sectors each having a lip forming portion, an outer panel forming portion and an inner panel forming portion. The outer panel forming portions and lip forming portions are formed by a continuous one-piece wall. At at least one junction between two adjacent sectors, an opening and a hatch are provided between the outer panel forming portions of the sectors. The inner panel forming portions and the lip forming portions of the sectors are edge to edge and fixed to each other by fixing devices accessible from the inside of the sectors and invisible from outside of the sectors. A maintenance method in which, when a zone of a sector is damaged, the sector concerned is removed as a whole and is replaced by a new of "recycled" sector is also described.

14 Claims, 5 Drawing Sheets

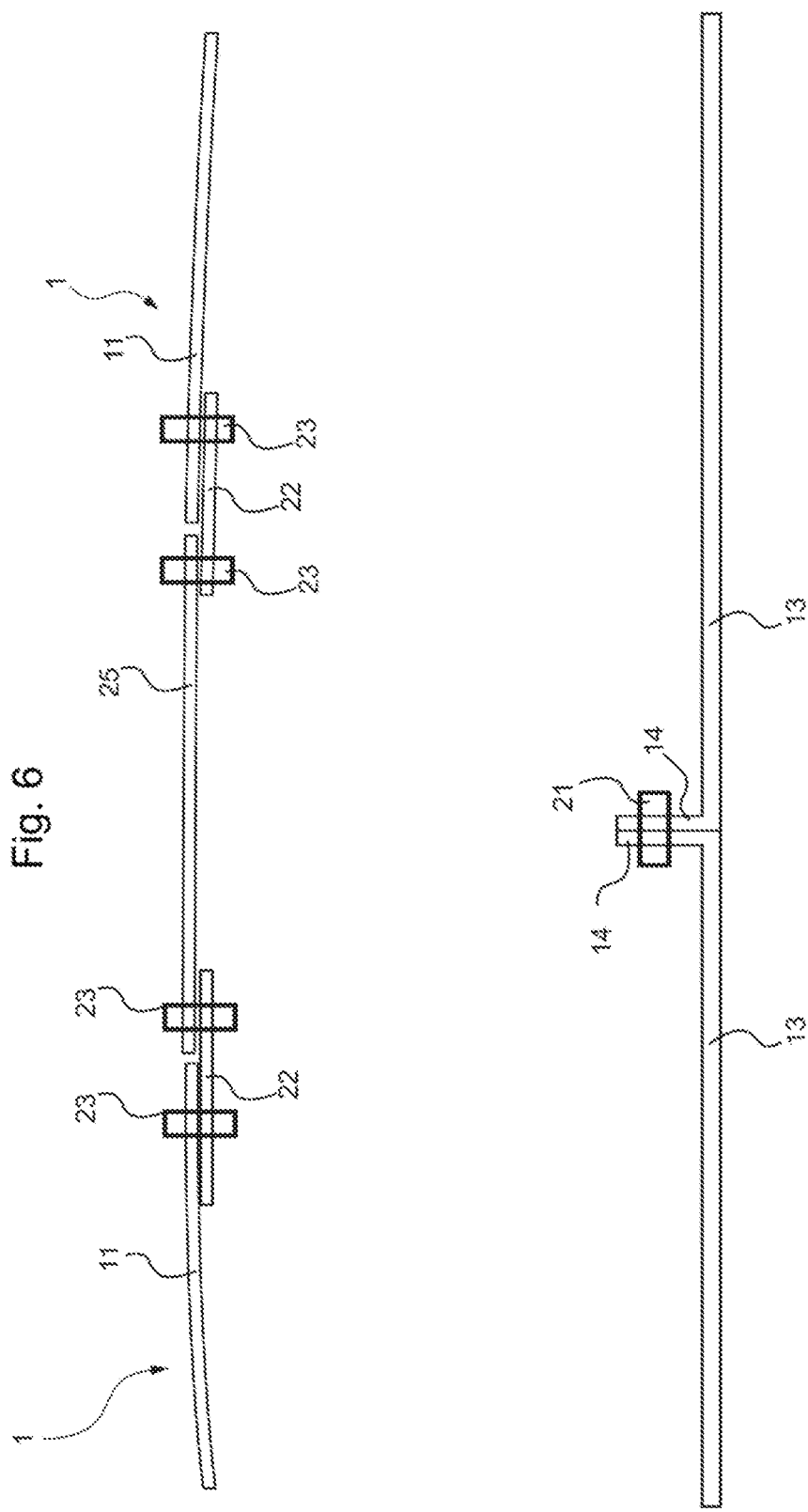

AIR INTAKE, NACELLE AND PROPULSION UNIT FOR MONOBLOC SECTOR AIRCRAFT

FIELD OF THE INVENTION

The invention relates to a propulsion assembly for an aircraft, more precisely a nacelle of such a propulsion assembly, and yet more precisely an aircraft nacelle air intake.

BACKGROUND OF THE INVENTION

Conventionally, an aircraft nacelle comprises, from front to back, a first section upstream of the aerodynamic flow, called the air intake, a second section which covers the casing of the engine fan, called the fan cowl, and a third section which generally has a thrust reversal zone which surrounds the turbine shell of the engine downstream of the aerodynamic flow.

An air intake, such as shown in the appended FIG. 1, usually comprises structural components such as a forward frame 101 and a rear frame 104, as well as, from front to back of the nacelle, a lip 100 borne by the forward frame, outer panels 102 extending the lip on the outside of the nacelle (and forming an outer wall of the air intake), inner panels 103 extending the lip on the inside of the nacelle and forming an inner wall of the air intake delimiting an internal duct making it possible to channel the air towards the engine, the inner and outer panels being borne by the forward frame and the rear frame.

The shape of the air intake and/or the systems with which it is equipped must make it possible to avoid the formation and/or accumulation of ice or frost, to limit the impact of noise pollution (for this purpose the inner panels 103 are acoustic panels), to provide an aerodynamic function and to prevent the penetration of birds into the fan compartment containing the engine systems.

The de-icing of the air intake is ensured by the provision of longitudinal de-icing tubes 105 bringing hot air from the engine to the duct having a D-shaped cross-section formed by the forward frame 101 and the lip 100.

The fixing of the lip, of the inner panels and of the outer panels onto the forward frame is obtained by at least two lines of rivets (an outer line and an inner line), which form orbital seams which cause early disturbances of the aerodynamic profile and increase the drag.

Moreover, the number of parts constituting the air intake makes its assembly complex and generates maintenance and repair procedures difficult to implement (some parts are difficult to access and it is often necessary to disassemble many parts order to be able to change the defective or damaged one).

BRIEF SUMMARY OF THE INVENTION

The present solutions for reducing the impact of the orbital seams on the aerodynamic flows and for simplifying the manufacture and the repair of air intakes essentially consist of limiting the number of sectors constituting the lip (between 3 and 5 only) and the number of outer panels and of inner panels of the air intake. These solutions only partially reduce the problems mentioned above and reach their limit as the diameter of the nacelles increases.

The purpose of the invention is to provide an air intake of simplified design, which makes it possible to facilitate maintenance operations and to reduce their costs, and whose impact on the aerodynamic flows and on the drag is lower.

In order to do this, the invention proposes an aircraft nacelle air intake comprising:
- sectors each comprising a lip forming portion, an outer panel forming portion and an inner panel forming portion,
- junctions between the sectors.

The air intake according to the invention is characterized in that:
- the sectors are fixed to each other by detachable fixing devices that are accessible from inside the sectors,
- at at least one junction between two sectors, an access opening, allowing access to the inside of the sectors, is provided between the outer panel forming portions of the said sectors,
- each access opening is closed by a detachable hatch, which has an outer face flush with and extending the outer face of the outer panel forming portions of the two sectors which delimit the access opening.

The principal advantage of the invention is that each sector can be considered as being a "one-piece" sector and dealt with as such in the context of the maintenance operations on the air intake. It is in fact possible to remove a sector entirely by withdrawing one of the access hatches according to the invention in order to be able to access the fixing devices which connect the sector to be removed to the two sectors which surround it and then by withdrawing those fixing devices.

From then on, when a zone of a sector is damaged in any manner whatsoever, it suffices to withdraw the entire sector and to replace it with a new sector or a "recycled" sector (an old sector having been repaired and thereafter being ready for use). The damaged sector zone can then be repaired for a subsequent use of the sector thus recycled, whereas the aircraft is put back into service without delay. The time of immobilization of an aircraft due to a nacelle being damaged is thus considerably reduced, as are the maintenance costs.

The invention extends to a method for the maintenance of an air intake such as previously defined having suffered damage to a zone of one of its sectors, characterized in that:
- the damaged sector is entirely removed; in order to do this, one of the hatches of the air intake is withdrawn in order to access the fixing devices connecting the damaged sector to the two sectors that surround it, which fixing devices are then withdrawn; if the air intake comprises a hatch fixed to the damaged sector, it is precisely that hatch that is withdrawn in order to access the abovementioned fixing devices, the withdrawal of the hatch making it possible to detach the outer panel forming portion of the damaged sector from the rest of the air intake; if no hatch is fixed to the damaged sector, the hatch to be withdrawn is the one providing the easiest access to the fixing devices to be withdrawn,
- a new or recycled sector is installed instead and in place of the damaged sector previously withdrawn.

The damaged sector can then be repaired (the damaged zone is repaired or changed) in masked time, for recycling purposes, or can possibly be destroyed if no repair is possible, whereas the aircraft is put back into service immediately.

Another advantage of the invention is that it is possible to provide fixing devices between sectors having no parts protruding outside of the sectors, or even fixing devices fully housed inside the sectors (and therefore totally invisible from the aerodynamic point of view), since the latter are accessible from the inside of the sectors. Consequently, the zones in which a natural laminarity performance is sought either have no fixing devices or are provided solely with invisible fixing devices. Moreover, for the fixing of the hatches to the sectors, which necessitates fixing devices accessible from outside of the nacelle, it is possible to provide fixing devices that are almost invisible from the aerodynamic point of view, for example screws with heads embedded in the thickness of the hatch.

According to one possible feature of the invention, an access opening closed by a hatch is provided at each junction between sectors. As a variant, an access opening closed by a hatch is provided at every other junction of the air intake. At the level of a junction having no access opening, the outer panel forming portions of the two sectors delimiting the junction have longitudinal edges in contact, which can be fixed to each other by fixing devices that are identical or similar to those which connect the lip forming portions (or the inner panel forming portions) of the said sector together.

Several embodiments can be envisaged for the fixing devices connecting the sectors together.

According to a first embodiment, the lip forming portion and the inner panel forming portion of each sector have opposing longitudinal edges which are provided with lateral mounting flanges which extend radially towards the inside of the sector, these lateral mounting flanges being drilled with holes for receiving fasteners for the fixing of the said sector to two adjacent sectors. In this first embodiment, the fixing means between the sectors at the level of the lip forming portions and of the inner panel forming portions are therefore fully housed inside of the sectors, which is made possible by the presence of the access hatches according to the invention.

According to a possible feature of the invention, the air intake comprises between two and twelve sectors such as previously defined depending on the size of the engine, or even between four and twelve sectors, with a preference for six sectors.

According to a possible feature of the invention, each hatch is fixed in a detachable manner to the outer panel forming portions of the two adjacent sectors which surround the hatch using link plates extending such that they straddle under the said outer panel forming portions and under the said hatch.

As a variant, each longitudinal or transverse side delimiting an access opening has a thinned edge upon which the hatch closing the said opening bears. In other words, this variant has no link plates for fixing the hatch onto the sectors surrounding it.

Concerning the length (in the longitudinal direction) of the access openings and associated hatches, two main embodiments are foreseen.

According to a first embodiment, the access opening and the associated hatch extend over the whole length of the outer panel forming portions of the adjacent sectors which delimit the opening. The hatch is then qualified as a long hatch. In this first embodiment, the inner panel forming and lip forming portions of a same sector have coplanar longitudinal edges. When the sectors are joined together, the longitudinal edges of the lip forming portions (and of the inner panel forming portions respectively) of the two sectors are therefore in contact. Conversely, the outer panel forming portions of the sectors have "set back" longitudinal edges with respect to the longitudinal edges of the other two portions.

According to the second embodiment, the access opening and the hatch extend only over a part of the length of the outer panel forming portions of the sectors which delimit the opening. The hatch is then qualified as a short hatch. In this second embodiment, the inner panel forming and lip forming portions have coplanar longitudinal edges as previously explained for the first embodiment, whereas the longitudinal edges of the outer panel forming portion of the sectors have a set back part, a recess and a part in contact with the longitudinal edge of the adjacent sector, this latter part being able to be provided with a mounting flange like the lip forming and inner panel forming portions. Preferably, the short hatch extends from the front end of the outer panel forming portion to an intermediate point between the front and rear ends of the said portion.

An air intake according to the invention can comprise only short hatches, only long hatches or possibly a combination of long and short hatches.

In a noteworthy version of the invention, the sectors each comprise a continuous one-piece wall in which are formed the outer panel forming portion and the lip forming portion of the sector. In this version, the orbital line of fixing devices between the lip and the outer panels of the air intakes of the prior art is therefore eliminated. The drag is thus considerably reduced.

Conventionally, the inner panel forming portion of each sector comprises a rear skin and an acoustic lining.

According to a possible feature of the abovementioned noteworthy version of the invention, the continuous wall of the sector (which constitutes the outer panel forming portion and the lip forming portion of the sector) is extended in order to also form the rear skin of the inner panel forming portion. The acoustic lining at least partially covers this rear skin; it comprises a resistive skin capable of absorbing sound waves and a core capable of absorbing the said waves, the resistive skin and the core being configured in such a way that the resistive skin is flush at the level of the lip forming portion of the continuous wall of the sector.

Thus, not only does the sector comprise a continuous one-piece wall but it also integrates all of the usual functions of the air intake (flow separation lip, outer panel, inner panel, thermo-acoustic insulation, etc.) in an extremely simplified design.

The acoustic lining can be formed at the same time as the one-piece continuous wall, during a same manufacturing step. As a variant, lining panels are bonded, during a subsequent step, onto the previously formed one-piece continuous wall. Manufacturing in a single step, at a single work station, is preferred.

According to a possible feature of the invention, each sector integrates electrical de-icing means, preferably within the thickness of its one-piece continuous wall.

The invention extends to a nacelle, a propulsion assembly and an aircraft having an air intake according to the invention.

According to a possible feature of the invention in its noteworthy version, the one-piece continuous wall of each sector of the air intake is fixed to a rear frame by a first line of fixing devices, for example a line of rivets (other fixing devices being possible). The one-piece continuous wall of each sector of the air intake is also fixed to an engine flange by a second line of fixing devices (for example bolts).

According to a possible feature of the invention in its noteworthy version, the one-piece continuous wall of each sector is made of a composite thermoplastic material, preferably a thermoplastic carbon, that is to say a material based on carbon fibers and a thermoplastic resin, for example a high performance thermoplastic resin, such as a PEEK (Polyetheretherketone), a PPS (polyphenylsulfone), a PEI (polyetherimide), a PEKK (Polyetherketoneketone), etc. It can also be a material based on glass fibers or a mixed material based on carbon and glass fibers.

As a variant, the one-piece continuous wall is made of a thermosetting composite material.

As a variant, it comprises at least one zone (which can be one of its previously defined portions or only a part of such a portion) made of thermosetting material and at least one zone (which can be one of its previously defined portions or only a part of such a portion) made of thermoplastic material.

The continuous wall of the sectors can also be made of a hybrid material combining metal and composite material. The wall can be formed of several layers of different materials assembled by bonding or possibly by countersunk rivets invisible from the aerodynamic point of view.

BRIEF DESCRIPTION OF THE DRAWINGS

Other details and advantages of the present invention will become apparent on reading the following description, which refers to the appended diagrammatic drawings and relates to preferred embodiments, provided as non-limiting examples. In these drawings:

FIG. 6 is a cross-sectional view of the air intake shown in FIGS. 5 and 6.

DETAILED DESCRIPTION

Figure 4:
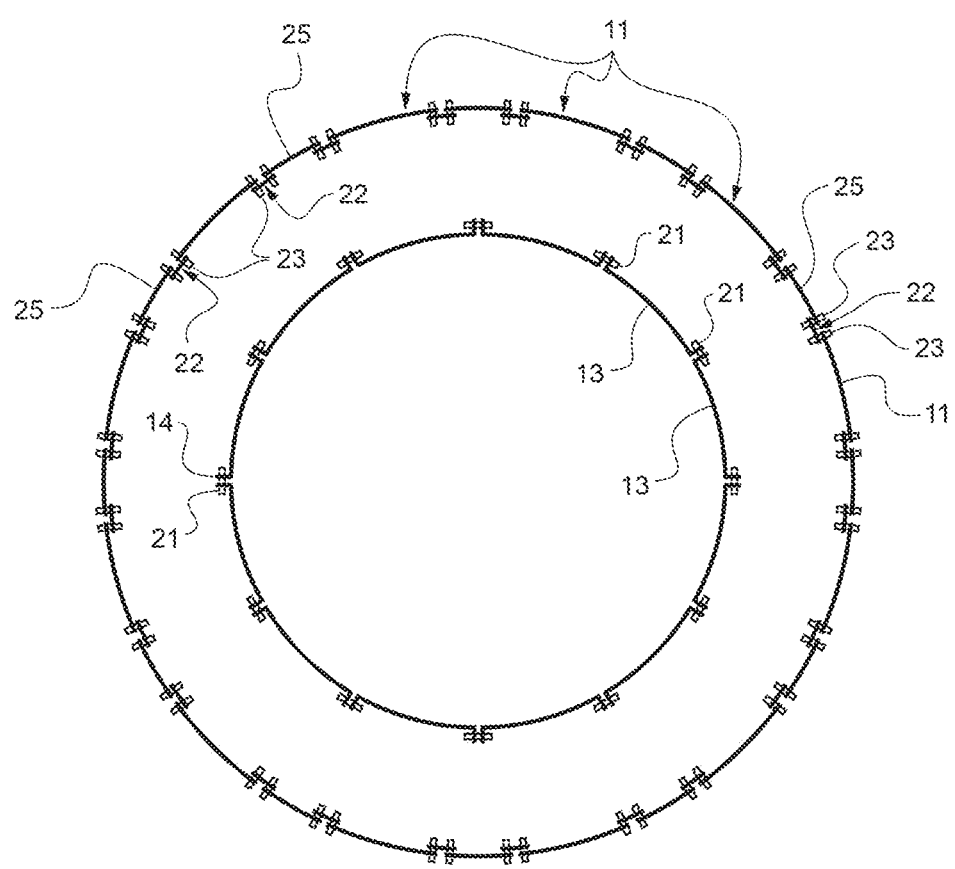
FIG. 4 is a back view of an embodiment of an air intake according to the invention whose sectors are those shown in FIG. 3.

The air intake according to the invention shown in the appended figures is essentially composed of a plurality of sectors 1, called one-piece sectors, for example of twelve one-piece sectors 1 as shown in FIG. 4. As a variant, it can comprise only six one-piece sectors or an even lower number of one-piece sectors.

Each one-piece sector 1 comprises according to one embodiment a one-piece continuous wall 10 comprising a lip forming portion 12, an outer panel forming portion 11 and an inner panel forming portion 13. For the purpose of simplicity, the reference 13 denotes both the inner panel forming portion of the one-piece sector and the portion of one-piece wall forming the rear skin of the said inner panel forming portion.

Each one-piece sector 1 is fixed to a rear frame 19 by a first line of fixing devices (rivets) 17 at the rear end of the outer panel forming portion 11 of its continuous one-piece skin. It is moreover fixed to an engine flange (not shown) by a second line of fixing devices 18 at the rear end of the inner panel forming portion 13 of its continuous one-piece skin.

The inner panel forming portion 13 of the one-piece sector 1 comprises an acoustic lining 15 which covers the rear skin and whose visible face 16 is microperforated in order to be able to absorb sound waves. The acoustic lining is preferably formed at the same time as the one-piece continuous wall 10.

Each one-piece sector 1 has, at each of its longitudinal edges, a lateral mounting flange 14 which protrudes radially towards the inside of the one-piece sector and which is drilled with holes 20 for fixing the one-piece sector to an adjacent one-piece sector using fasteners 21. This lateral fixing flange is only present along the lip formant 12 and inner panel forming 13 portions of the sectors.

The outer panel forming portion 11 does not have a lateral flange. Moreover, the different portions of the one-piece sector are dimensioned such that, when two one-piece sectors are placed side by side and the lateral fixing flanges 14 of the lip forming portions and inner panel forming of the said sectors are in contact, a space remains between the longitudinal edges of the outer panel forming portions. This space between the outer panel forming portions of the two adjacent sectors define an opening which makes it possible to easily access the lateral fixing flanges 14 of the other two portions for the positioning or removal of the fasteners 21. This opening is covered by a hatch 25 which is fixed to the outer panel forming portions 11 of the two adjacent sectors by means of longitudinal link plates 22 and of fasteners 23. Each longitudinal link plate can be replaced by a shoulder formed all along the longitudinal edge of the outer panel forming portion of the one-piece sector, upon which shoulder the hatch 25 would bear (in this variant, only two lines of fasteners remain—instead of four—at each junction between one-piece sectors around the hatch).

To dismantle the air intake during a maintenance operation, the hatch 25 is removed in order to easily access the fasteners 21.

The hatch 25 has a smooth outer face which is flush with and extends the outer face of the one-piece sectors 1 in such a way as to limit the aerodynamic disturbances. As the lines of fixing devices 23 extend in longitudinal planes (planes containing the axis of the air intake), they have only a little impact on the aerodynamic flows (contrary to the orbital seams formed by the fixing devices connecting the outer, or internal, panels to the lip sectors in the known air intakes of the prior art). Moreover, it is possible to provide fixing devices 23 whose head is embedded in the wall thickness of the hatch, in order to further limit, or even to eliminate, the aerodynamic impact of these fixing devices.

Figure 5:
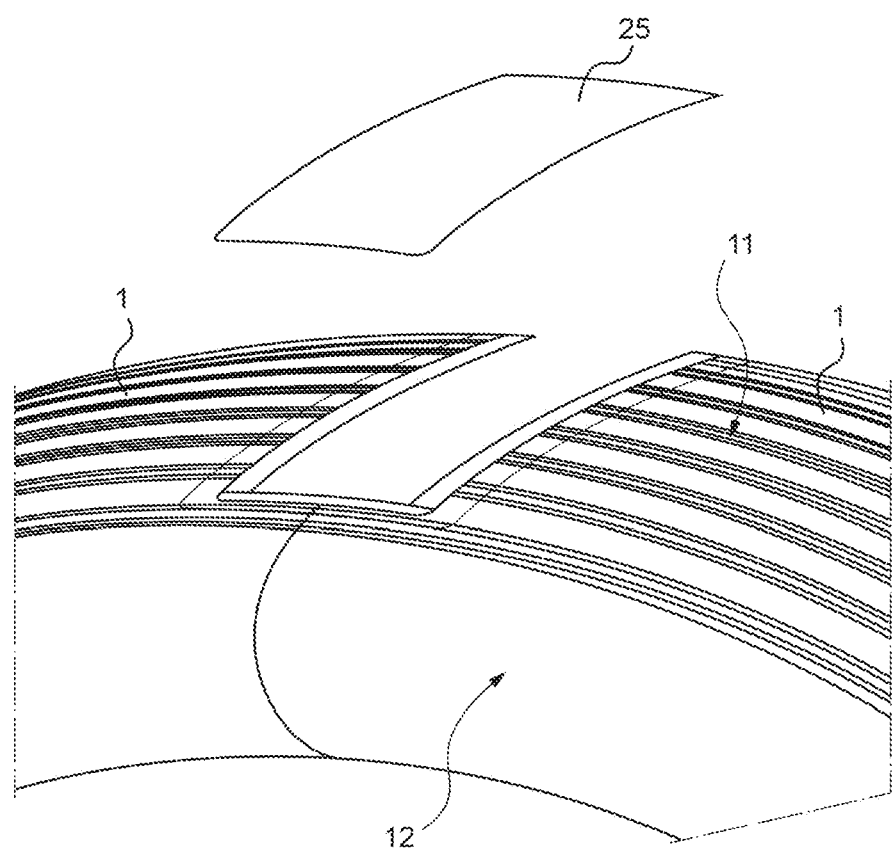
FIG. 5 is a perspective view of a part of the air intake shown in FIG. 4 at the junction between two sectors.

It should be noted that two orbital link plates 24 can also be provided on the front and rear edges of the hatch 25 (the front orbital link plate can be seen in FIG. 5). The hatch 25 advantageously has a transverse dimension (along this orbital link plate) as small as possible in order to limit the number of fasteners necessary on the orbital link plate in order to prevent the formation of an orbital seam likely to have an impact on the drag. Thus, the transverse dimension of the dimension of the hatch 25 is advantageously very much less than its longitudinal dimension (dimension in a plane containing the axis of the air intake).

The one-piece continuous wall of the sectors 10 can be produced by molding a sheet of composite thermoplastic or thermosetting material, such as a thermoplastic or thermosetting carbon used in the aeronautical field (high performance composite material based on long carbon fibers and a thermoplastic or thermosetting resin).

Figure 1:
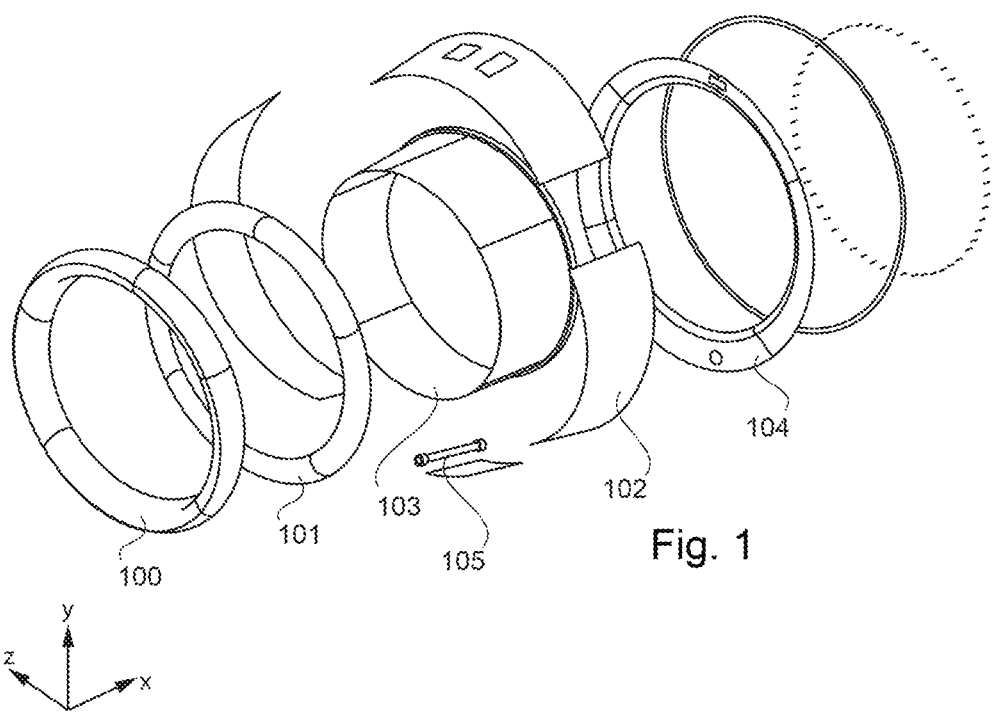
FIG. 1 is a diagrammatic view in exploded perspective of an air intake of the prior art.
Figure 2:
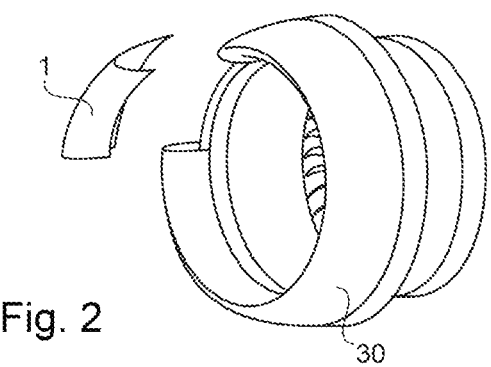
FIG. 2 is a diagrammatic view in perspective of an air intake according to the invention from which one sector is detached.
Figure 3:
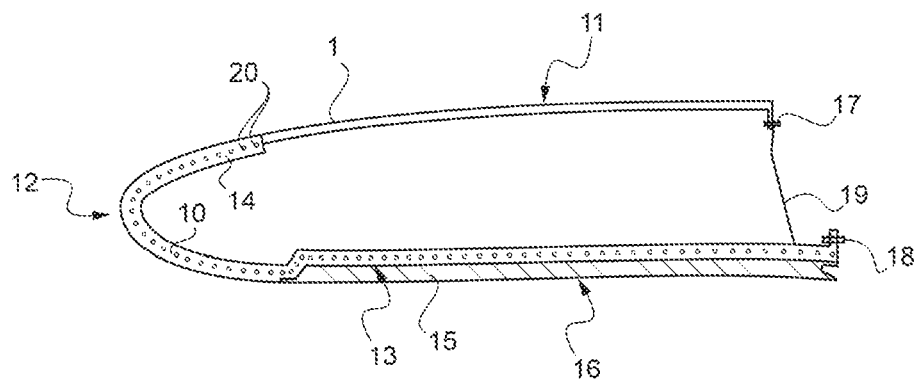
FIG. 3 is a diagrammatic view of the profile of an air intake according to the invention according to one embodiment.

An examination of the figures suffices to give an understanding that the design, the manufacture and the repair of an air intake according to the invention are extremely simplified in comparison with the air intakes of the prior art such as shown in FIG. 1. In particular, it is observed that each one-piece sector according to the invention combines in one and the same part a sector of the lip, an outer panel and an inner panel of the air intakes of the prior art.

Moreover, in an air intake according to the invention, the forward frame can be eliminated.

In fact, in the known air intakes of the prior art, the forward frame fulfills two functions: a first structural function of reinforcement of the air intake and absorbing bird strike and a second function of de-icing of the air intake by means of the duct having a D shaped cross-section that it forms with the lip sectors, this duct having a D shaped cross-section being fed with hot air coming from the engine.

The one-piece continuous wall made of composite material of the one-piece sectors according to the invention has improved mechanical strength which makes it possible to do without the forward frame, the absorbing of bird strike then being carried out by the rear frame.

In the case of elimination of the forward frame, the de-icing function can be carried out by electrical de-icing means, for example by equipping the one-piece continuous wall of each sector with electrical heating cables. As a variant, the air intake comprises, for each one-piece sector, a partition component inserted in the one-piece sector in order to form a duct having a D shaped cross section with the lip forming portion of the one-piece continuous wall, and the air intake comprises at least one tube bringing a flow of hot air into the duct having a D shaped cross section thus formed. Contrary to the forward frame components of the air intakes of the prior art, this partition component is not dimensioned in order to fulfill a structural function. Likewise, the fixing between the partition component and the one-piece sector does not have the purpose of transmitting strong forces, nor of absorbing bird strike. The partition component can therefore be lighter than a forward frame component and can simply be bonded onto the inner surface of the one-piece sector or fixed to the said sector by any appropriate means not giving rise to the appearance of an orbital seam likely to have an impact on the drag.

The air intake according to the invention is lighter than the air intakes of the prior art because of the simplifications applied to its structure, which is an important advantage in the aircraft field. It is even more so if the forward frame is eliminated.

Moreover, the rear frame of an air intake according to the invention can have a form other than the one shown. For example, the rear frame can be inclined in such a way that its outer circumference (fixed to the rear end of the outer panel forming portion of the one-piece sectors) is located farther downstream than its inner circumference (fixed to the rear end of the inner panel forming portion of the one-piece sectors).

The invention extends to any variant accessible to those skilled in the art, that is to say included in the context defined by the appended claims.

In particular, for reasons of format or dimensions of sheet metal or of production means, and provided that it retains its final one-piece and not easily dismantled function, each sector can have two parts (a part comprising a one-piece wall constituting both the lip forming portion and the outer panel forming portion, and a part corresponding to the inner panel forming portion of the sector), or even three parts (each part corresponding to one of the previously defined portions) which are independent and fixed to each other by any appropriate means. In this case, the beneficial impact on the drag because of the elimination of orbital seams of the prior art is not obtained but the advantage of the one-piece nature of the sectors remains complete in terms of simplification and of reduction of the costs of maintenance operations.

The invention claimed is:

1. An aircraft nacelle comprising, from front to back:
an air intake;
a fan cowl; and
a thrust reversal zone,
wherein the air intake comprises:
a plurality of sectors and a plurality of junctions between two of the sectors, each sector comprising a lip forming portion, an inner panel forming portion and an outer panel forming portion, wherein:
the plurality of sectors is fixed to each other by detachable fixing devices accessible from inside the sectors,
at, at least one junction between two of the sectors, an access opening is provided between the outer panel forming portions of the said sectors, and
each access opening is closed by a detachable hatch having an outer face flush with and extending outer faces of the outer panel forming portions of the two sectors which delimit the access opening.

2. The aircraft nacelle according to claim 1, wherein the access opening comprises an access opening closed by a hatch at each junction between sectors.

3. The aircraft nacelle according to claim 1, wherein the access opening comprises an access opening closed by a hatch at every other junction of the air intake.

4. The aircraft nacelle according to claim 1, wherein the lip forming portion and the inner panel forming portion of each of the plurality of sectors have opposing longitudinal edges comprising lateral mounting flanges extending radially towards an inside of the corresponding one of the plurality of sectors, the lateral mounting flanges comprising holes for receiving fasteners for the fixing of the said sector to two adjacent sectors of the plurality of sectors.

5. The aircraft nacelle according to claim 1, wherein the plurality of sectors comprises between two and twelve sectors.

6. The aircraft nacelle according to claim 1, wherein each of the detachable hatch is fixed in a detachable manner to the outer panel forming portions of the two adjacent sectors surrounding the hatch using link plates extending such that the link plates straddle under the said outer panel forming portions and under the said detachable hatch.

7. The aircraft nacelle according to claim 1, wherein each longitudinal or transverse side delimiting the access opening has a thinned edge, wherein the detachable hatch closing the said opening bears upon the thinned edge.

8. The aircraft nacelle according to claim 1, wherein the sectors each comprises a continuous one-piece wall in which are formed the outer panel forming portion and the lip forming portion of the sector.

9. The aircraft nacelle according to claim 8, wherein the inner panel forming portion of each of the plurality of sectors comprises a rear skin and an acoustic lining, and a continuous wall of the sector, which constitutes the outer panel forming portion and the lip forming portion, is extended to also form the said rear skin.

10. The aircraft nacelle according to claim 8, wherein the one-piece continuous wall of the sectors comprises at least one zone made of a thermoplastic material and/or a zone made of a thermosetting material.

11. The aircraft nacelle according to claim 10, wherein the one-piece continuous wall of the sectors comprises at least one zone made of thermoplastic carbon.

12. A propulsion assembly for aircraft comprising a nacelle according to claim 1.

13. An aircraft comprising a nacelle according to claim 1.

14. A method for the maintenance of an aircraft nacelle according to claim 1, having suffered damage to a zone of one of the plurality of sectors, wherein:
- the damaged sector is entirely removed,
- a new or recycled sector is installed instead and in place of the damaged sector previously withdrawn,
- the damaged sector is subsequently repaired or destroyed whereas the aircraft is put back into service.

* * * * *